US012769066B2

(12) United States Patent
Lee et al.

(10) Patent No.: US 12,769,066 B2
(45) Date of Patent: Oct. 20, 2026

(54) FIBER ARRAY UNIT AND PHOTONICS DEVICE

(71) Applicant: BIZLINK INTERNATIONAL CORP., New Taipei City (TW)

(72) Inventors: Tsung-Han Lee, New Taipei City (TW); Tzu-Fang Tseng, New Taipei City (TW); Chih Wei Lu, New Taipei City (TW)

(73) Assignee: BIZLINK INTERNATIONAL CORP., New Taipei City (TW)

( * ) Notice: Subject to any disclaimer, the term of this patent is extended or adjusted under 35 U.S.C. 154(b) by 286 days.

(21) Appl. No.: 18/639,439

(22) Filed: Apr. 18, 2024

(65) Prior Publication Data

US 2025/0327981 A1 Oct. 23, 2025

(51) Int. Cl.
*G02B 6/38* (2006.01)

(52) U.S. Cl.
CPC ......... *G02B 6/3885* (2013.01); *G02B 6/3881* (2013.01)

(58) Field of Classification Search
CPC .................................................... G02B 6/4224
See application file for complete search history.

(56) References Cited

U.S. PATENT DOCUMENTS 10,656,339 B2 5/2020 Patel et al.
2001/0004413 A1* 6/2001 Aihara ................. G02B 6/4224 385/88
2003/0117482 A1* 6/2003 Border ................... G02B 27/32 347/224
2003/0118071 A1* 6/2003 Border ................. G02B 6/3833 372/50.12
2003/0231829 A1* 12/2003 Meyers ................ G02B 6/4212 385/33
2021/0080662 A1 3/2021 Erickson et al.

FOREIGN PATENT DOCUMENTS

| | | |
|---|---|---|
| CN | 100526995 | 8/2009 |
| TW | 202338416 | 10/2023 |
| WO | 2022/193151 | 9/2022 |
| WO | 2023/044101 | 3/2023 |

OTHER PUBLICATIONS

M. Hirano et al., "Extremely Low-Profile Single Mode Fiber Array Coupler Suitable for Silicon Photonics" Electronic Components and Technology Conference, May 1, 2019 (ref.01) (file attached).

* cited by examiner

*Primary Examiner* — Jerry Rahll
(74) *Attorney, Agent, or Firm* — CKC & Partners Co., LLC

(57) ABSTRACT

A fiber array unit includes a transparent structure and a plurality of optical fibers. The transparent structure has an observing surface and a mating surface substantially parallel to each other. The observing surface and the mating surface are on a same light path. The transparent structure has a first alignment pattern formed on the mating surface. At least a portion of the first alignment pattern is transparent. The first alignment pattern is axially symmetrical about two axes, and the two axes are perpendicular to each other. The optical fibers at least partially located within the transparent structure. The optical fibers allow light beams to enter the transparent structure through an entrance surface thereof and to exit from the mating surface thereof.

16 Claims, 15 Drawing Sheets

230A

FIBER ARRAY UNIT AND PHOTONICS DEVICE

BACKGROUND

Technical Field

The present disclosure relates to a fiber array unit and a photonics device.

Description of Related Art

As disclosed by FIG. 1 of the paper titled 'Extremely Low-Profile Single Mode Fiber Array Coupler Suitable for Silicon Photonics,' published in the Electronic Components and Technology Conference on May 1, 2019. Fiber array and grating coupler alignment is an important part of optical communication systems. Fiber arrays are used to combine or separate multiple optical fiber channels, while grating couplers are used to couple light from optical fibers to waveguides or other optical components on a substrate. The accuracy of fiber array and grating coupler alignment directly affects the performance of optical communication systems.

Accordingly, how to provide an alignment method that has higher accuracy and lower cost becomes an important issue to be solved by those in the industry.

SUMMARY

An aspect of the disclosure is to provide a fiber array unit and a photonics device that can efficiently solve the aforementioned problems.

According to an embodiment of the disclosure, a fiber array unit includes a transparent structure and a plurality of optical fibers. The transparent structure has an observing surface and a mating surface substantially parallel to each other.

The observing surface and the mating surface are on a same light path. The transparent structure has a first alignment pattern formed on the mating surface. At least a portion of the first alignment pattern is transparent. The first alignment pattern is axially symmetrical about two axes, and the two axes are perpendicular to each other. The optical fibers at least partially located within the transparent structure. The optical fibers allow light beams to enter the transparent structure through an entrance surface thereof and to exit from the mating surface thereof.

In an embodiment of the disclosure, the transparent structure includes a first portion and a second portion. The second portion is engaged with the first portion. The optical fibers are disposed between the first portion and the second portion.

In an embodiment of the disclosure, the first portion has a side surface facing the second portion. A plurality of grooves are formed on the side surface. The second portion covers the grooves to respectively form a plurality of accommodating passages between the first portion and the second portion. The optical fibers are respectively accommodated in the accommodating passages.

In an embodiment of the disclosure, the transparent structure has a first end and a second end opposite to each other. The optical fibers pass into the transparent structure from the first end and extend toward the second end. The mating surface is on the second end.

In an embodiment of the disclosure, the first alignment pattern is disposed on one of the first portion and the second portion.

In an embodiment of the disclosure, the mating surface is on a side of the second portion away from the first portion.

In an embodiment of the disclosure, the transparent structure further has a second alignment pattern formed on the mating surface. At least a portion of the second alignment pattern is transparent. The second alignment pattern is axially symmetrical about two axes, and the two axes are perpendicular to each other. The observing surface is different from the entrance surface of the transparent structure.

In an embodiment of the disclosure, the plurality of optical fibers enter the transparent structure via an entrance surface. At least a portion of the optical fibers is exposed from the mating surface.

In an embodiment of the disclosure, the mating surface is different from the entrance surface.

In an embodiment of the disclosure, the mating surface is substantially perpendicular to the entrance surface.

According to an embodiment of the disclosure, a photonics device includes a fiber array unit and a substrate. The fiber array unit includes a transparent structure. The transparent structure has an observing surface and a mating surface substantially parallel to each other. The observing surface and the mating surface are on a same light path. The transparent structure has a first alignment pattern formed on the mating surface. At least a portion of the first alignment pattern is transparent. The first alignment pattern is axially symmetrical about two axes, and the two axes are perpendicular to each other. The substrate includes a second alignment pattern disposed thereon. The second alignment pattern is axially symmetrical about two axes that are perpendicular to each other. A spatial frequency of the first alignment pattern is equal to or similar to a spatial frequency of the second alignment pattern. The first alignment pattern and the second alignment pattern are overlapped and aligned.

In an embodiment of the disclosure, the fiber array unit further includes a plurality of optical fibers entering the transparent structure.

In an embodiment of the disclosure, the transparent structure includes a first portion and a second portion. The second portion is engaged with the first portion. The optical fibers are disposed between the first portion and the second portion.

In an embodiment of the disclosure, the first portion has a side surface facing the second portion. A plurality of grooves are formed on the side surface. The second portion covers the grooves to respectively form a plurality of accommodating passages between the first portion and the second portion. The optical fibers are respectively accommodated in the accommodating passages.

In an embodiment of the disclosure, the transparent structure has a first end and a second end opposite to each other. The optical fibers enter the transparent structure from the first end and extend toward the second end. The mating surface of the transparent structure is on the second end.

In an embodiment of the disclosure, the first alignment pattern is disposed on one of the first portion and the second portion.

In an embodiment of the disclosure, the mating surface of the transparent structure is on a side of the second portion away from the first portion.

In an embodiment of the disclosure, the optical fibers enter the transparent structure via an entrance surface. At least a portion of the optical fibers is exposed from the mating surface. The mating surface is different from the entrance surface.

In an embodiment of the disclosure, the mating surface of the transparent structure and a mating surface of the substrate on which the second alignment pattern is disposed are parallel to each other.

In an embodiment of the disclosure, the first alignment pattern and the second alignment pattern are aligned with each other in a direction perpendicular to the mating surface of the transparent structure and the mating surface of the substrate.

Accordingly, in the fiber array unit of the present disclosure, the alignment pattern disposed on the mating surface of the transparent structure is axially symmetrical about two axes that are perpendicular to each other. On the other hand, the alignment pattern disposed on the mating surface of the substrate of the photonics device is axially symmetrical about two axes that are perpendicular to each other, and the spatial frequencies of the two alignment patterns are equal or similar. When the two alignment patterns are viewed in a direction perpendicular to the two mating surfaces parallel to each other, the two alignment patterns that are not accurately aligned will produce moiré patterns. On the contrary, the two alignment patterns that are accurately aligned will not produce moiré patterns. Therefore, whether the alignment is completed can be determined based on whether the two alignment patterns generate moiré patterns, which has higher accuracy and lower cost compared to the conventional alignment method.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
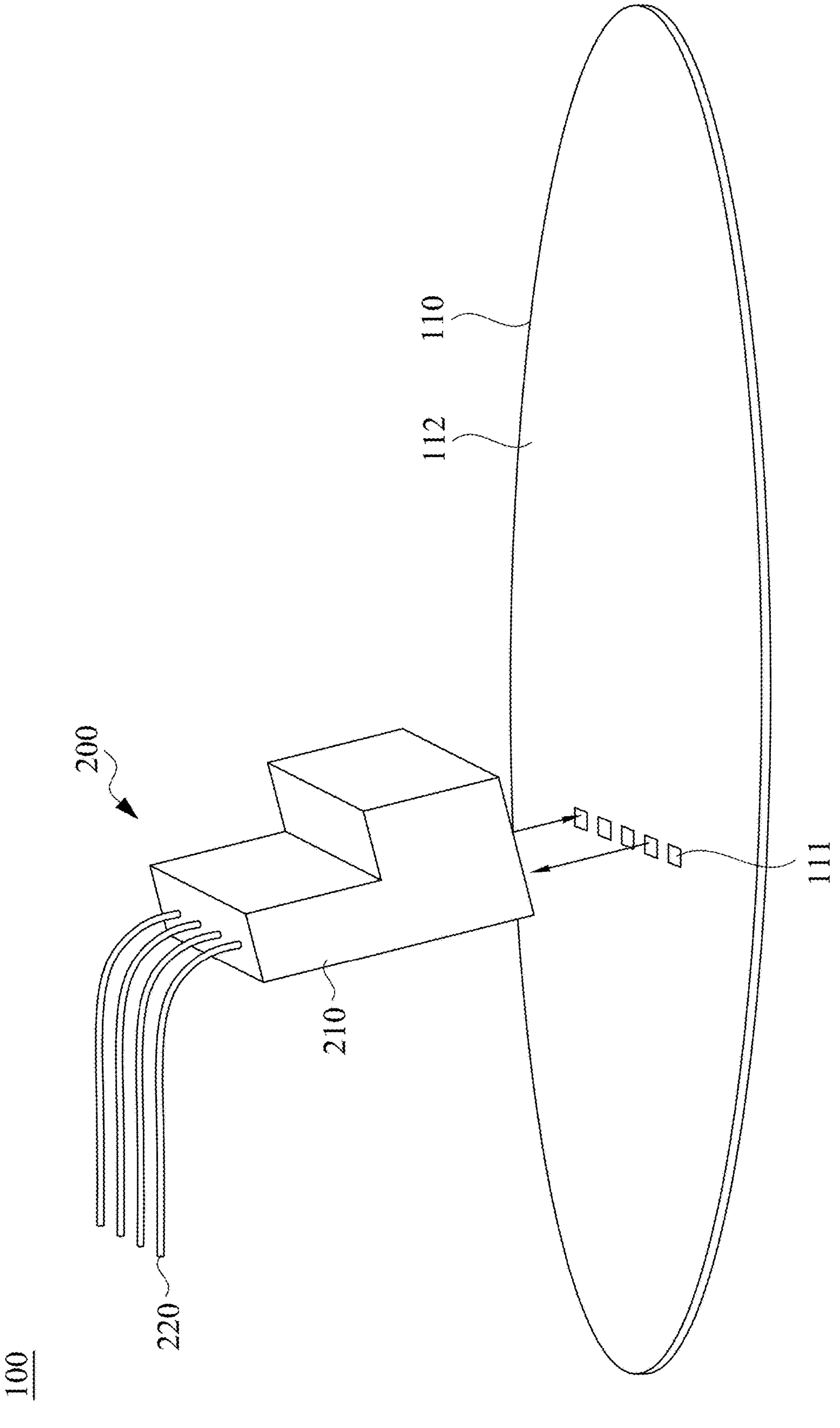
FIG. 1 is a perspective view of a photonics device during alignment according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a perspective view of a photonics device 100 during alignment according to an embodiment of the present disclosure. As shown in FIG. 1, the photonics device 100 includes a fiber array unit 200 and a substrate 110. The fiber array unit 200 includes a transparent structure 210 and a plurality of optical fibers 220. The optical fibers 220 enter the transparent structure 210 via an entrance surface 210*c*. In other words, the optical fibers 220 are held by the transparent structure 210. The substrate 110 includes a mating surface 110*a* and a plurality of grating couplers 111 disposed on the mating surface 110*a*. The alignment between the fiber array unit 200 and the substrate 110 is performed to optically coupling the optical fibers 220 with the grating couplers 111 respectively. After the alignment is completed, the transparent structure 210 can be fixed to the substrate 110 in various ways, such as gluing the transparent structure 210 and the substrate 110, but the present disclosure is not limited thereto. In this way, the relative positions of the transparent structure 210 and the substrate 110 can be fixed.

In some embodiments, the substrate 110 may be a wafer, a printed circuit board, a Complementary Metal-Oxide-Semiconductor (CMOS), an optical switcher, or a Wavelength Division Multiplexing (WDM), but the present disclosure is not limited thereto.

Figure 2:
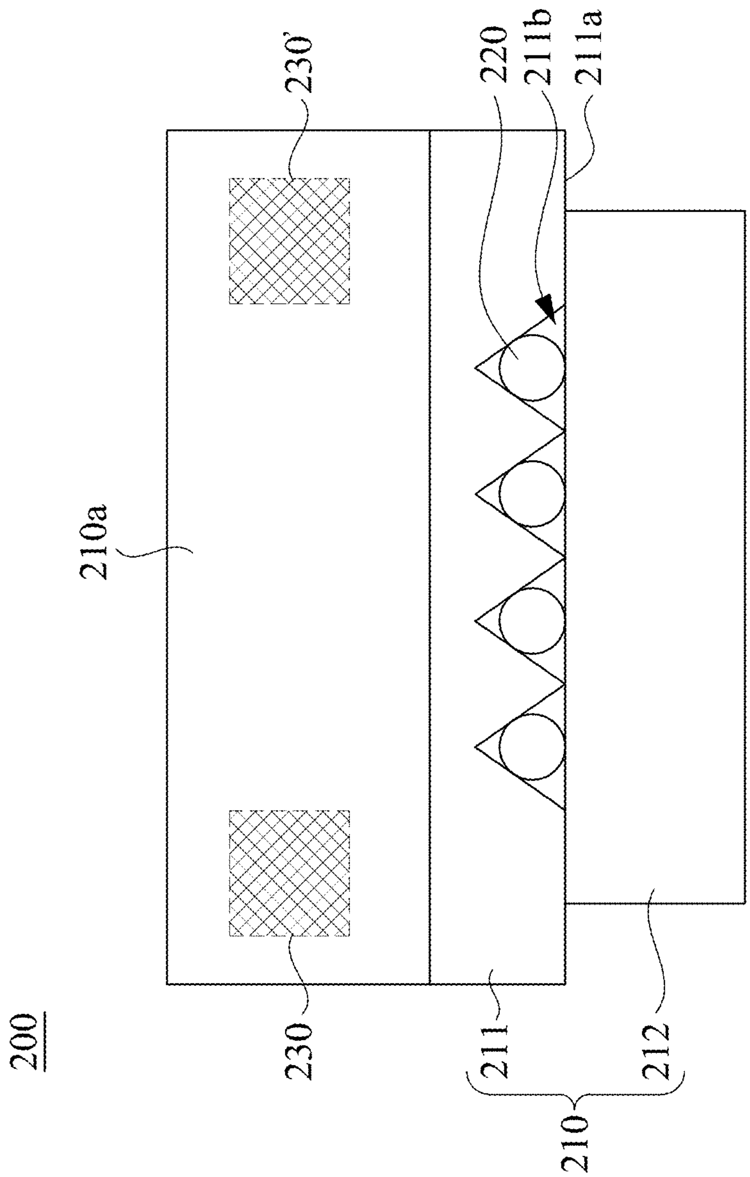
FIG. 2 is a bottom view of a fiber array unit in FIG. 1.

Reference is made to FIG. 2. FIG. 2 is a bottom view of the fiber array unit 200 in FIG. 1. As shown in FIG. 2, in the present embodiment, the transparent structure 210 includes a first portion 211 and a second portion 212. The second portion 212 is engaged with the first portion 211. For example, the first portion 211 and the second portion 212 may be bonded to each other using transparent glue, but the present disclosure is not limited thereto. The optical fibers 220 are disposed between the first portion 211 and the second portion 212.

Specifically, as shown in FIG. 2, the first portion 211 of the transparent structure 210 has a side surface 211*a* facing the second portion 212. A plurality of grooves 211*b* are formed on the side surface 211*a*. The second portion 212 covers the grooves 211*b* to respectively form a plurality of accommodating passages between the first portion 211 and the second portion 212. The optical fibers 220 are respectively accommodated in the accommodating passages.

In some embodiments, as shown in FIG. 2, the grooves 211*b* on the side surface 211*a* of the first portion 211 of the transparent structure 210 have a jagged cross-section, but the present disclosure is not limited thereto.

Figure 3:
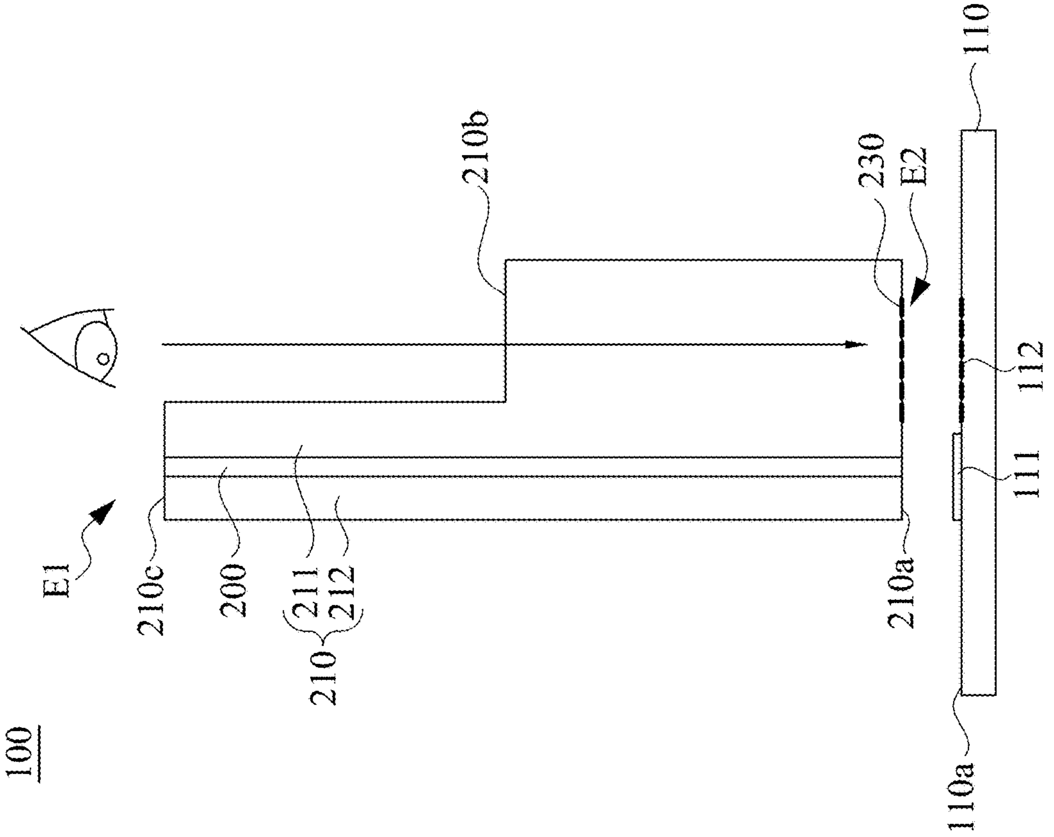
FIG. 3 is a side view of the photonics device in FIG. 1.

Reference is made to FIG. 3. FIG. 3 is a side view of the photonics device 100 in FIG. 1. As shown in FIG. 3, the transparent structure 210 has an observing surface 210*b* and a mating surface 210*a* substantially parallel to each other. The observing surface 210*b* and the mating surface 210*a* are on a same light path. The transparent structure 210 has an alignment pattern 230. The alignment pattern 230 is formed on the mating surface 210*a* of the transparent structure 210. At least a portion of the alignment pattern 230 is transparent. The optical fibers 220 at least partially located within the transparent structure 210. At least a portion of the optical fibers 220 is exposed from the mating surface 210*a*. That is, the optical fibers 220 are not entirely covered by the mating surface 210*a*. The optical fibers 220 pass into the transparent structure 210 from the entrance surface 210*c* for allowing light beams to enter the transparent structure 210 through the entrance surface 210*c* thereof and to exit from the mating surface 210*a* thereof. The substrate 110 further includes an alignment pattern 112. The alignment pattern 112 is disposed on the mating surface 110*a* of the substrate 110. Specifically, the transparent structure 210 has a first end E1 and a second end E2 opposite to each other. The mating surface 210*a* is different from the entrance surface 210*c*. The entrance surface 210*c* and the mating surface 210*a* are respectively on the first end E1 and the second end E2. Both the first portion 211 and the second portion 212 extend from the first end E1 to the second end E2. The optical fibers 220 pass into the transparent structure 210 from the first end E1 and extend toward the second end E2. The mating surface 210*a* is on the second end E2. In the present embodiment, the alignment pattern 230 is disposed on the first portion 211 of the transparent structure 210.

In the present embodiment, the observing surface 210*b* is different from the entrance surface 210*c* of the transparent structure 210, but the present disclosure is not limited in this regard. In practical applications, the observing surface 210*b* and the entrance surface 210*c* are different parts of the same surface.

During the alignment of the fiber array unit 200 and the substrate 110, an assembler of the photonics device 100 can place the fiber array unit 200 above the substrate 110 with the mating surface 210*a* of the transparent structure 210 and the mating surface 110*a* of the substrate 110 facing each other and parallel to each other. Then, the assembler can view the observing surface 210*b* of the transparent structure 210 from the first end E1 toward the second end E2. Since the transparent structure 210 is transparent, the assembler can see through the transparent structure 210 and see the alignment pattern 230 on the second end E2 and the alignment pattern 112 of the substrate 110. After the relative positions of the fiber array unit 200 and the substrate 110 are adjusted so that the alignment pattern 230 and the alignment pattern 112 are aligned, the alignment is completed. With the completion of the alignment, the optical fibers 220 can be optically coupled to the grating couplers 111 respectively.

Figure 4:
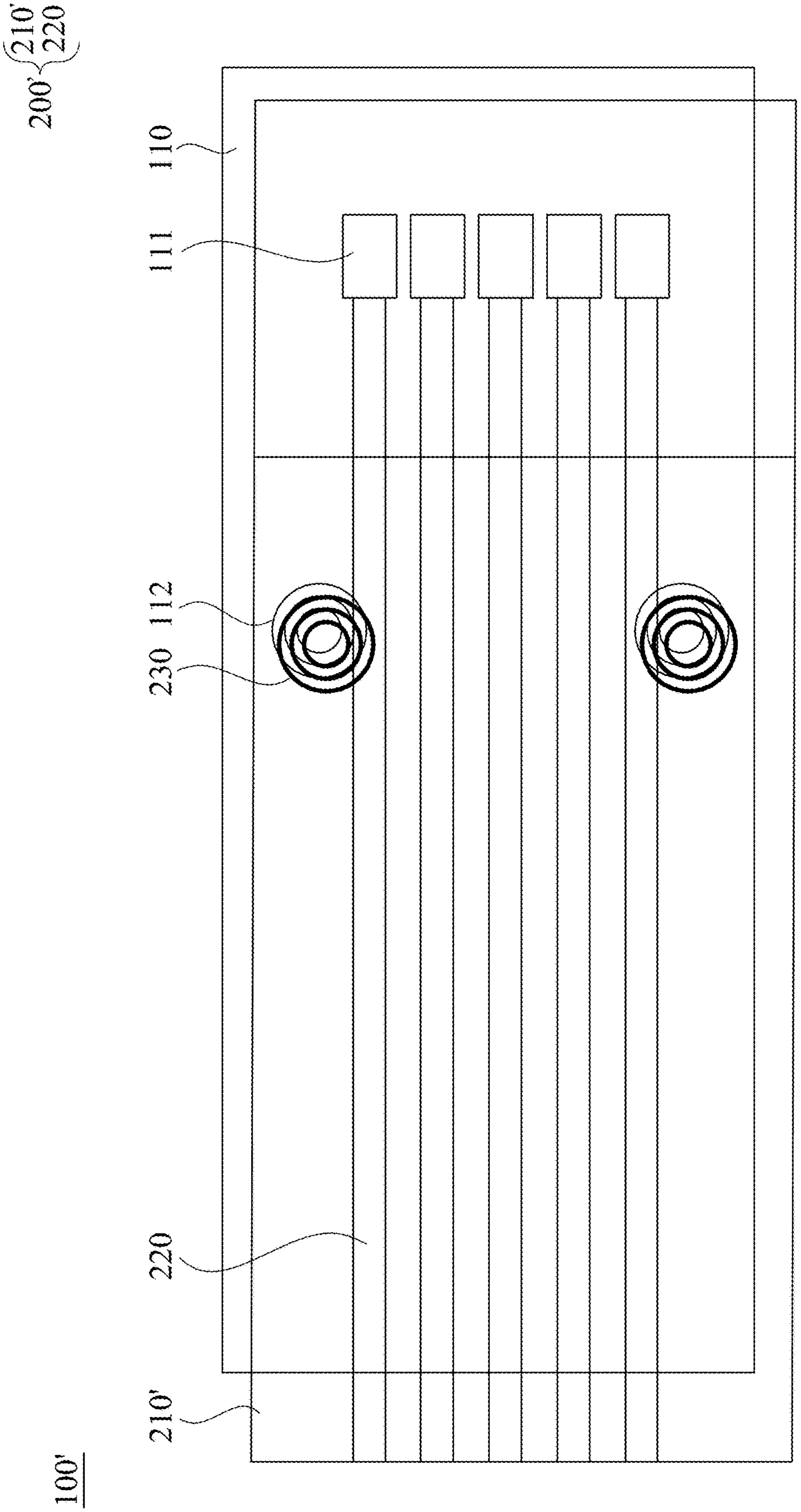
FIG. 4 is a top view of a photonics device according to an embodiment of the present disclosure.
Figure 5:
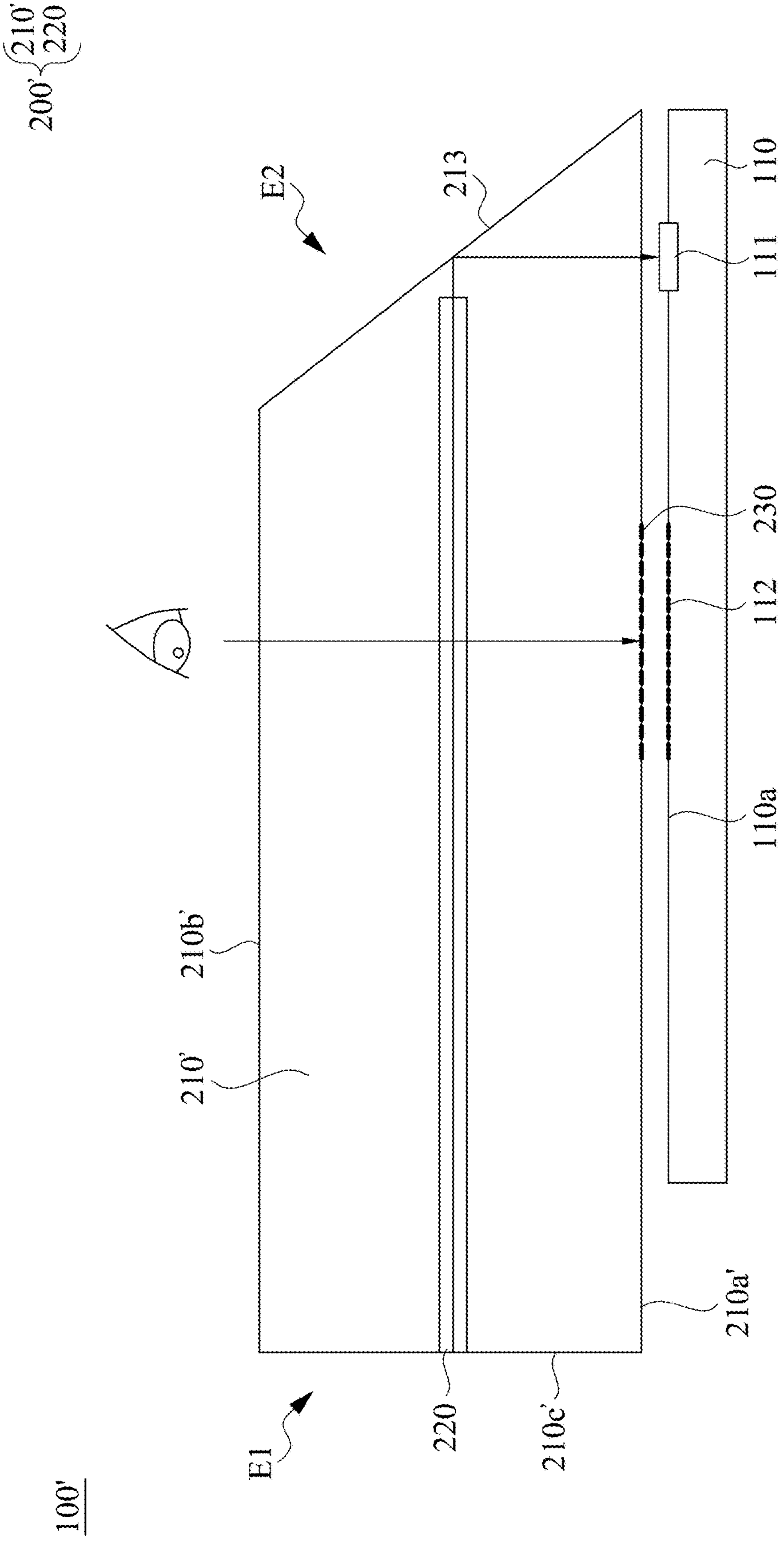
FIG. 5 is a side view of the photonics device in FIG. 4.

Reference is made to FIGS. 4 and 5. FIG. 4 is a top view of a photonics device 100' according to an embodiment of the present disclosure. FIG. 5 is a side view of the photonics device 100' in FIG. 4. As showing in FIGS. 4 and 5, the photonics device 100' includes a fiber array unit 200' and a substrate 110, in which the substrate 110 is identical to that of the embodiment shown in FIGS. 1 and 3, so the introductions of the substrate 110 can be referred to the above and will not be repeated here for simplicity. The fiber array unit 200' includes a transparent structure 210' and a plurality of optical fibers 220. The optical fibers 220 pass into the transparent structure 210'.

As shown in FIG. 5, the transparent structure 210' includes a first portion 211' and a second portion 212'. The second portion 212' is engaged with the first portion 211'. For example, the first portion 211' and the second portion 212' may be bonded to each other using transparent glue, but the present disclosure is not limited thereto. The optical fibers 220 are disposed between the first portion 211' and the second portion 212'. The first portion 211' may include the grooves 211*b* of the first portion 211 as shown in FIG. 2. The second portion 212' covers the grooves 211*b* of the first portion 211' to respectively form a plurality of accommodating passages between the first portion 211' and the second portion 212' for accommodating the optical fibers 220 respectively.

As shown in FIGS. 4 and 5, the fiber array unit 200' further includes the alignment pattern 230. The alignment pattern 230 is disposed on a mating surface 210*a'* of the transparent structure 210'. Specifically, in the present embodiment, the mating surface 210*a'* is on a side of the second portion 212' away from the first portion 211'. The transparent structure 210' further has an observing surface 210*b'* and an entrance surface 210*c'*. The observing surface 210*b'* and the mating surface 210*a'* are respectively on opposite sides of the transparent structure 210'. During the alignment of the fiber array unit 200' and the substrate 110, the assembler of the photonics device 100' can place the fiber array unit 200' above the substrate 110 with the mating surface 210*a'* of the transparent structure 210' and the mating surface 110*a* of the substrate 110 facing each other and parallel to each other. Then, the assembler can view the observing surface 210*b'* of the transparent structure 210' from a side of the first portion 211' away from the second portion 212'. Since the transparent structure 210' is transparent, the assembler can see through the transparent structure 210' and see the alignment pattern 230 on the mating surface 210*a'* and the alignment pattern 112 of the substrate 110. After the relative positions of the fiber array unit 200' and the substrate 110 are adjusted so that the alignment pattern 230 and the alignment pattern 112 are aligned, the alignment is completed.

In the present embodiment, the mating surface 210*a'* is substantially perpendicular to the entrance surface 210*c'*, but the present disclosure is not limited in this regard.

With the completion of the alignment, the optical fibers 220 can be optically coupled to the grating couplers 111 respectively. Specifically, as shown in FIG. 5, the transparent structure 210' has a first end E1 and a second end E2 opposite to each other. Both the first portion 211 and the second portion 212 extend from the first end E1 to the second end E2. The optical fibers 220 pass into the transparent structure 210' from the first end E1 and extend toward the second end E2. The transparent structure 210' has an inclined surface 213 on the second end E2. The inclined surface 213 has the function of reflecting light. In this regard, the optical fibers 220 and the grating couplers 111 can be optically coupled through reflection from the inclined surface 213.

Figure 6:
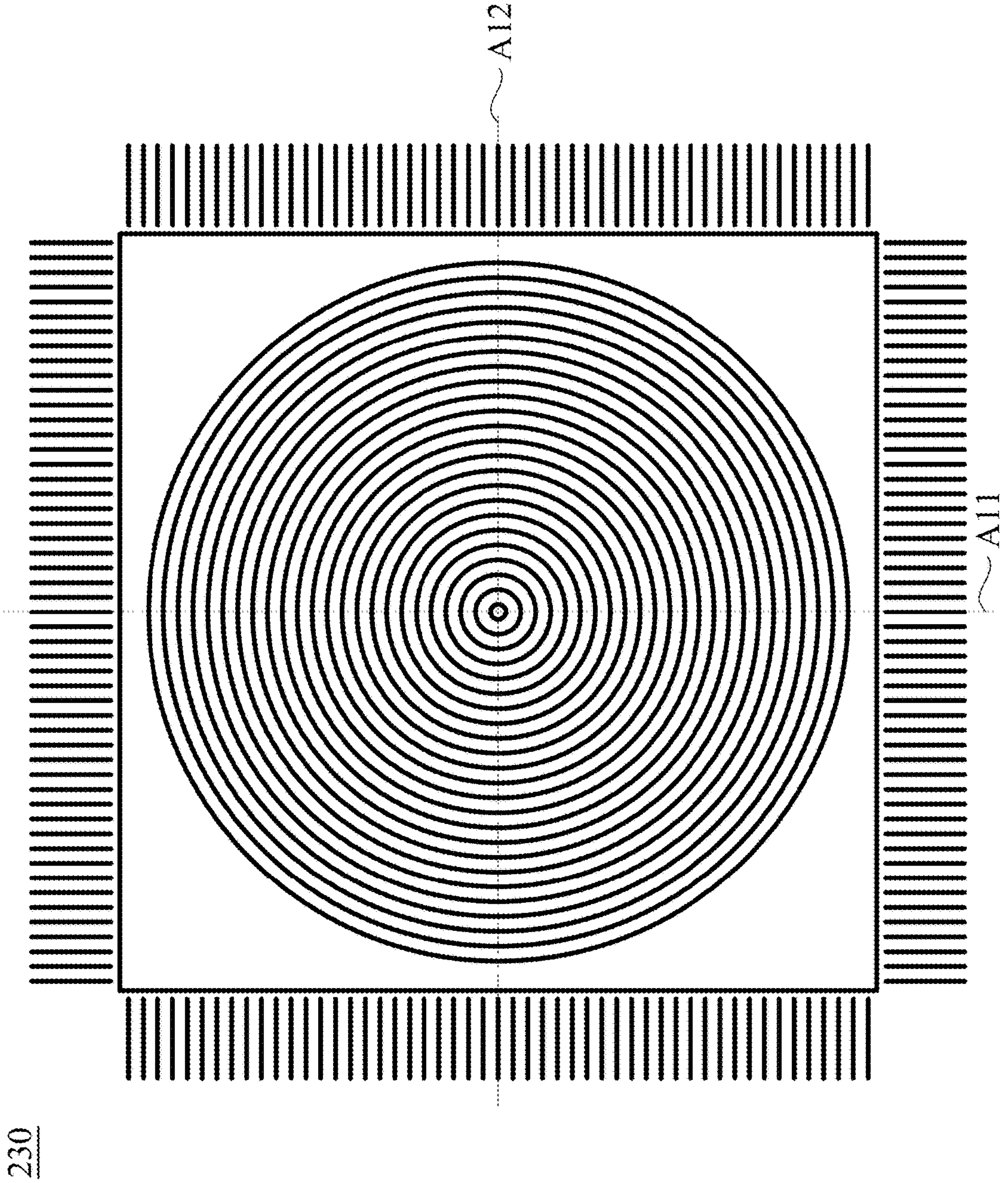
FIG. 6 is a schematic diagram of an alignment pattern of the fiber array unit according to an embodiment of the present disclosure.
Figure 7:
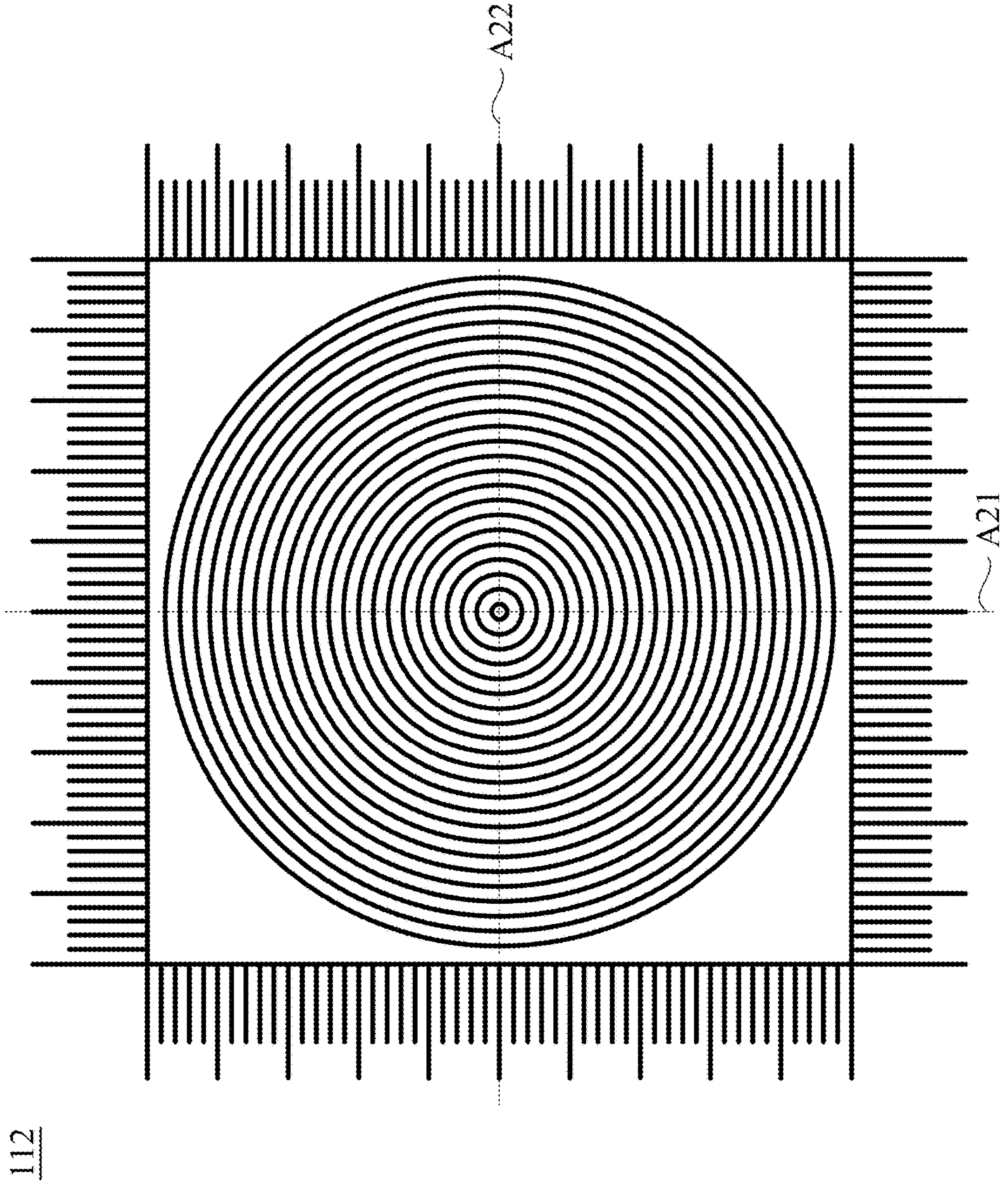
FIG. 7 is a schematic diagram of an alignment pattern on a substrate according to an embodiment of the present disclosure.
Figure 8:
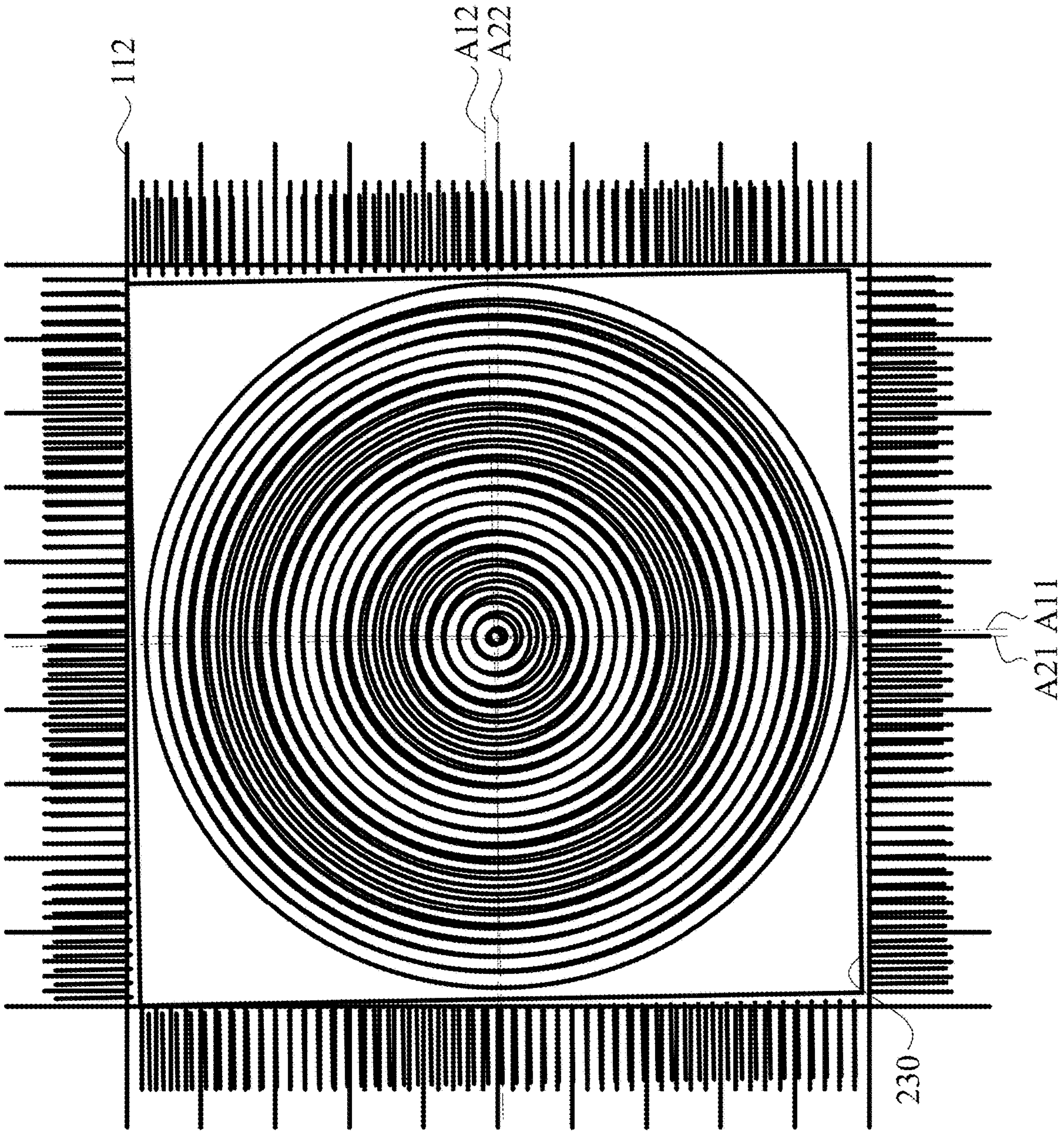
FIG. 8 is a schematic diagram of the alignment pattern in FIG. 6 and the alignment pattern in FIG. 7 overlapping each other according to an embodiment of the present disclosure.

Reference is made to FIGS. 6 to 8. FIG. 6 is a schematic diagram of the alignment pattern 230 of the fiber array unit 200 according to an embodiment of the present disclosure. FIG. 7 is a schematic diagram of the alignment pattern 112 on the substrate 110 according to an embodiment of the present disclosure. FIG. 8 is a schematic diagram of the alignment pattern 230 in FIG. 6 and the alignment pattern 112 in FIG. 7 overlapping each other according to an embodiment of the present disclosure. As shown in FIG. 6, the alignment pattern 230 is axially symmetrical about two axes A11, A12 that are perpendicular to each other and are parallel to the mating surface 210*a* of the transparent structure 210. As shown in FIG. 7, the alignment pattern 112 is axially symmetrical about two axes A21, A22 that are perpendicular to each other and are parallel to the mating surface 110*a* of the substrate 110.

Specifically, a spatial frequency of the alignment pattern 230 is equal to or similar to a spatial frequency of the alignment pattern 112. In this way, when the two alignment patterns 112, 230 are viewed in a direction perpendicular to the mating surface 110*a*, 210*a* parallel to each other, the two alignment patterns 112, 230 that are not accurately aligned will produce moiré patterns, as shown in FIG. 8. On the contrary, the two alignment patterns 112, 230 that are accurately aligned will not produce moiré patterns. Therefore, whether the alignment is completed can be determined based on whether the two alignment patterns 112, 230 generate moiré patterns, which has higher accuracy and lower cost compared to the conventional alignment method.

As shown in FIG. 2, the transparent structure 210 further has an alignment pattern 230' formed on the mating surface 210*a*. At least a portion of the alignment pattern 230' is transparent. The alignment patterns 230, 230' are identical or similar to each other. That is, the alignment pattern 230' is axially symmetrical about two axes, and the two axes are perpendicular to each other.

As shown in FIGS. 6 and 7, each of the alignment patterns 112, 230 includes a plurality of concentric circles with an intersection of the axes A11, A12 (or the axes A21, A22) as a center. Each of the alignment patterns 112, 230 further includes a plurality of straight lines arranged around a periphery of the concentric circles. The straight lines are divided into four groups. The concentric circles are arranged between two of the groups along the axis A11 (or the axis A21) with the straight lines of the two of the groups parallel to the axis A11 (or the axis A21). The concentric circles are arranged between the other two of the groups along the axis A12 (or the axis A22) with the straight lines of the other two of the groups parallel to the axis A12 (or the axis A22). The alignment pattern 112 has a constant line pitch. The alignment pattern 230 has a constant line pitch. It should be pointed out that the straight lines may be regarded as auxiliary alignment marks.

In some embodiments, the line pitch of the alignment pattern 112 is smaller than the line pitch of the alignment pattern 230. For example, the line pitch of the alignment pattern 112 is 0.96 times the line pitch of the alignment pattern 230, but the present disclosure is not limited thereto. In some embodiments, the line pitch of the alignment pattern 230 is about 50 μm, but the present disclosure is not limited thereto.

Figure 9:
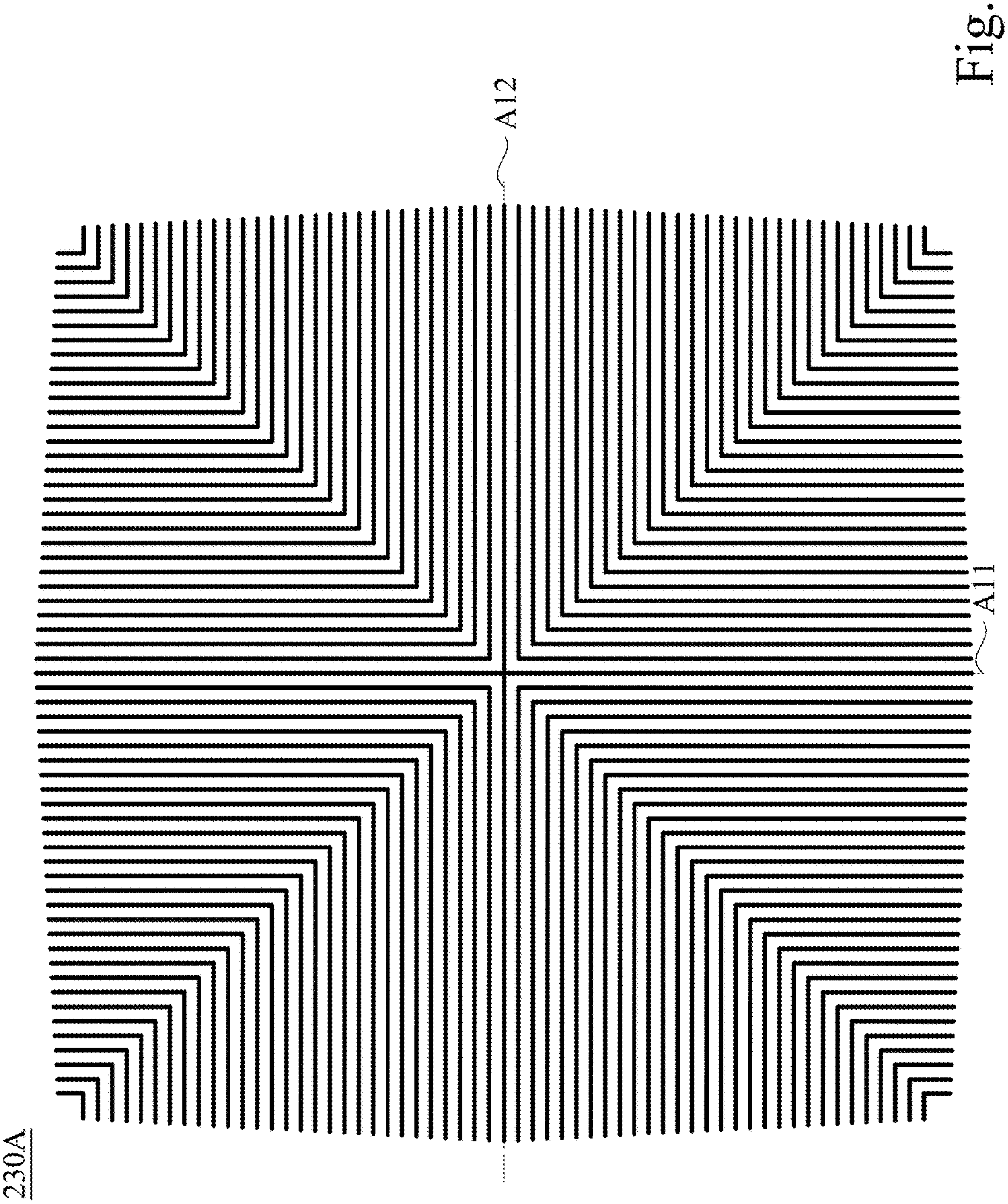
FIG. 9 is a schematic diagram of an alignment pattern of the fiber array unit according to an embodiment of the present disclosure.
Figure 10:
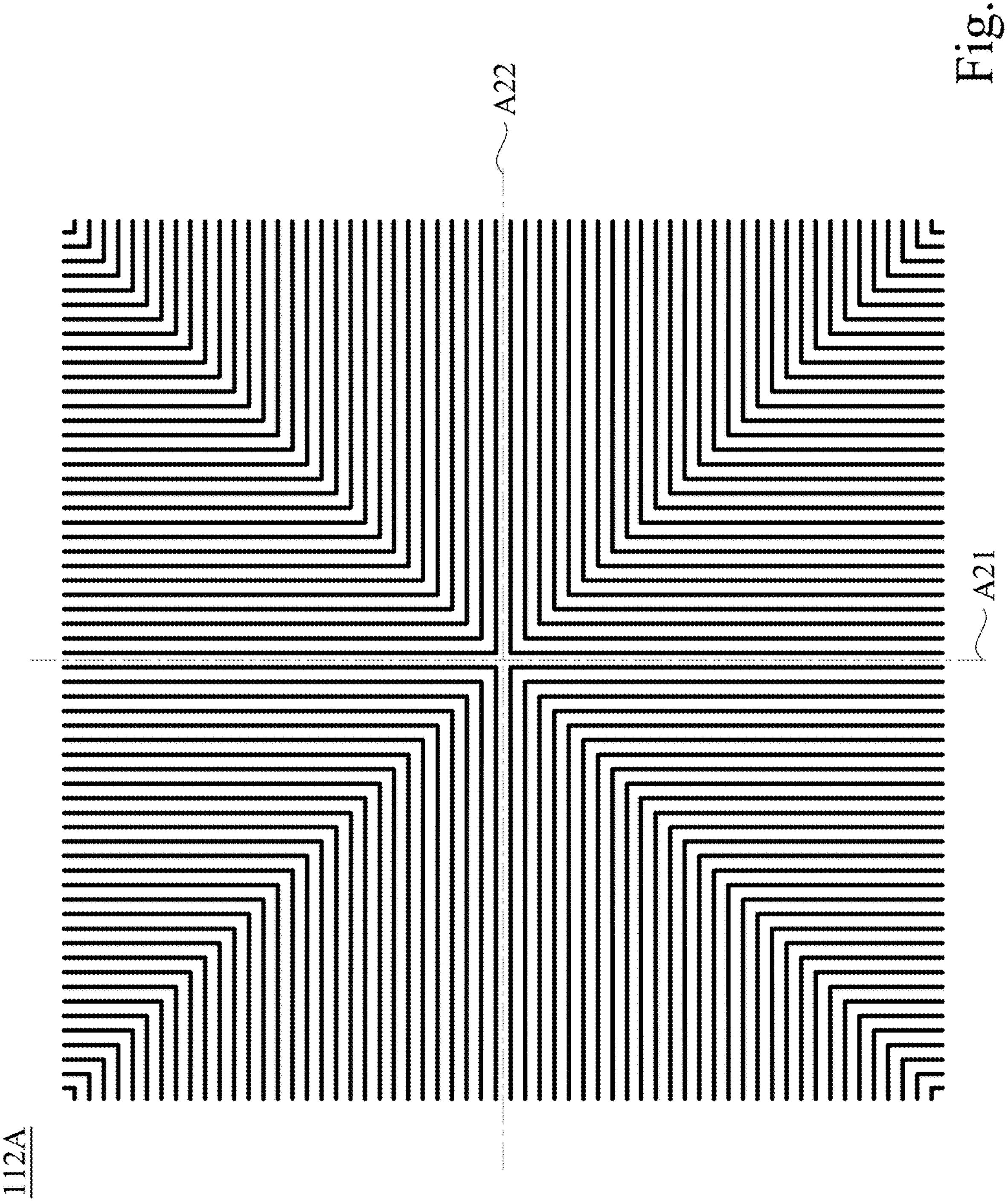
FIG. 10 is a schematic diagram of an alignment pattern on a substrate according to an embodiment of the present disclosure.
Figure 11:
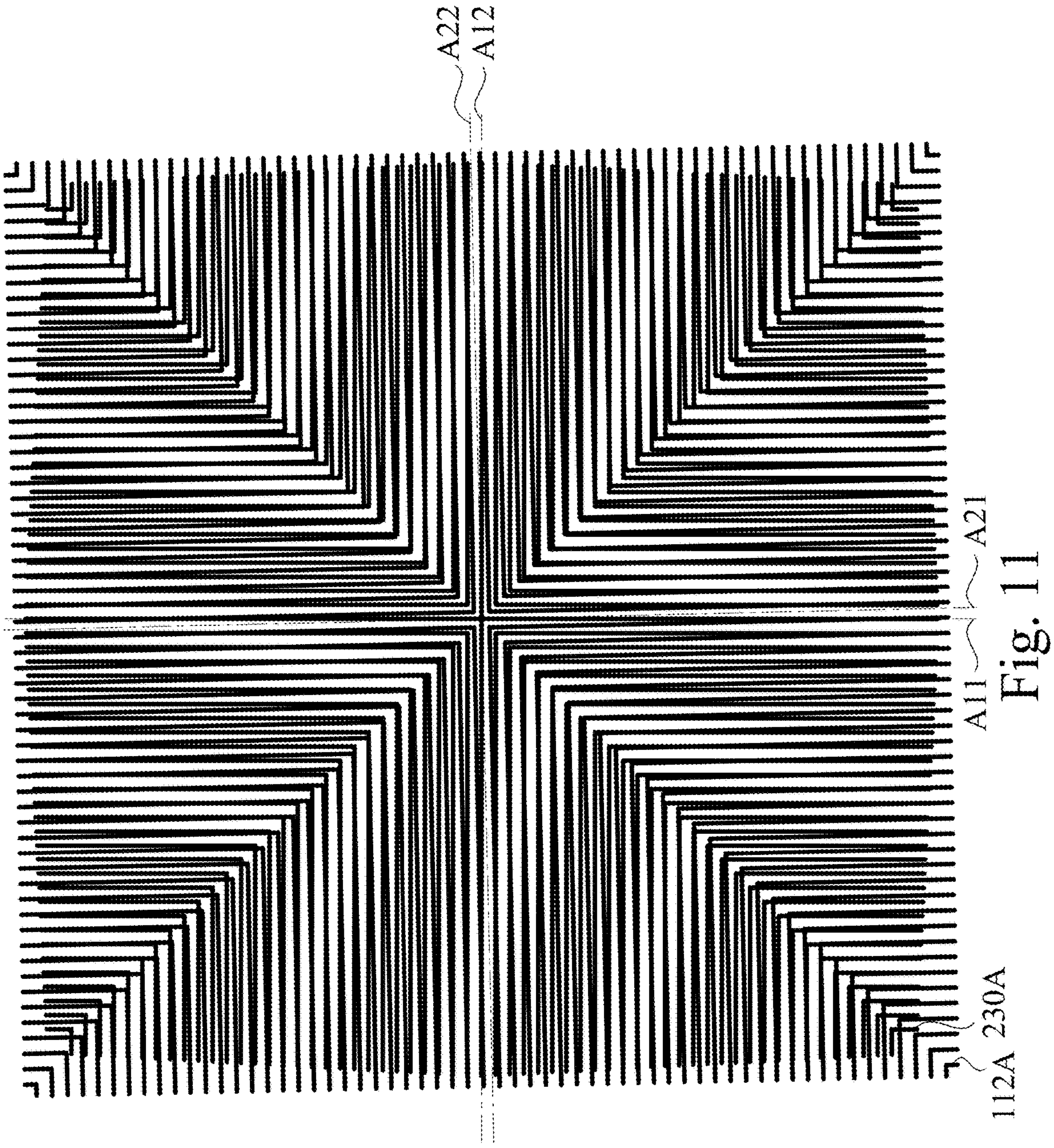
FIG. 11 is a schematic diagram of the alignment pattern in FIG. 9 and the alignment pattern in FIG. 10 overlapping each other according to an embodiment of the present disclosure.

Reference is made to FIGS. 9 to 11. FIG. 9 is a schematic diagram of an alignment pattern 230A of the fiber array unit 200 according to an embodiment of the present disclosure. FIG. 10 is a schematic diagram of an alignment pattern 112A on the substrate 110 according to an embodiment of the present disclosure. FIG. 11 is a schematic diagram of the alignment pattern 230A in FIG. 9 and the alignment pattern 112A in FIG. 10 overlapping each other according to an embodiment of the present disclosure. As shown in FIG. 9, the alignment patterns 230A includes a crosshair parallel to the axes A11, A12 and a plurality of L-shaped lines arranged in a compact manner in four quadrants divided by the crosshair. As shown in FIG. 10, the alignment patterns 112A includes a plurality of L-shaped lines arranged in a compact manner in four quadrants divided by the axes A21, A22. The alignment pattern 112A has a constant line pitch. The alignment pattern 230A has a constant line pitch. As shown in FIG. 11, since the two alignment patterns 112A, 230A are not accurately aligned, moiré patterns are produced.

In some embodiments, the line pitch of the alignment pattern 112A is smaller than the line pitch of the alignment pattern 230A. For example, the line pitch of the alignment pattern 112A is 0.96 times the line pitch of the alignment pattern 230A, but the present disclosure is not limited thereto. In some embodiments, the line pitch of the alignment pattern 230A is about 50 μm, but the present disclosure is not limited thereto.

Figure 12:
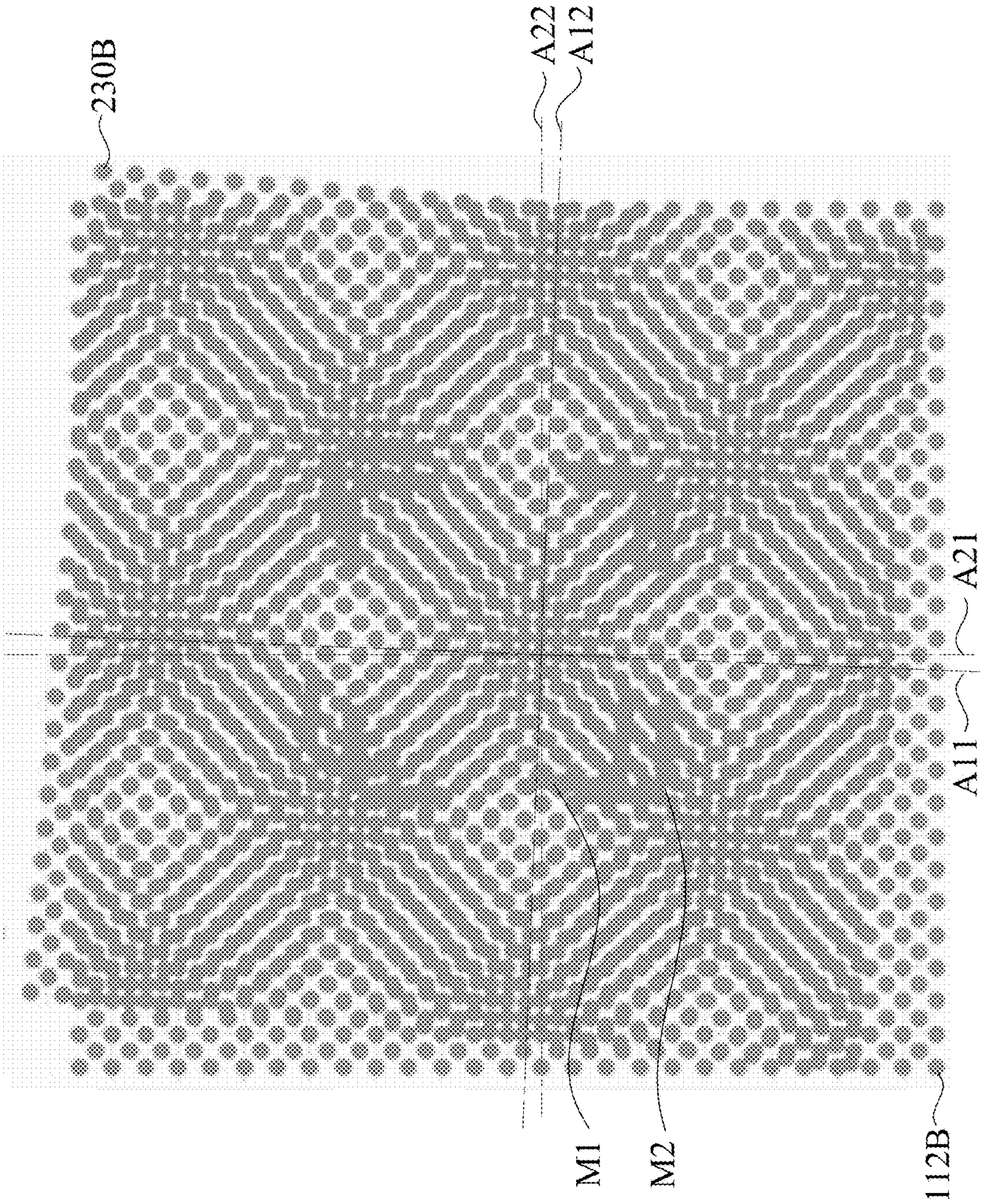
FIG. 12 is a schematic diagram of two alignment patterns overlapping each other according to an embodiment of the present disclosure.

Reference is made to FIG. 12. FIG. 12 is a schematic diagram of two alignment pattern 112B, 230B overlapping each other according to an embodiment of the present disclosure. As shown in FIG. 12, each of the alignment patterns 112B, 230B includes a matrix of points with two dimensions respectively along the axes A11, A12 (or the axes A21, A22). For clarity, the alignment patterns are presented in grayscale. Each of the points is in form of a round dot. Since the two alignment patterns 112B, 230B are not accurately aligned, moiré patterns are produced. It should be pointed out that two alignment patterns 230B, 112B further include auxiliary alignment frame M1, M2 arranged among the points. Each of the auxiliary alignment marks M1, M2 includes four L-shaped lines arranged to form an alignment frame.

Figure 13:
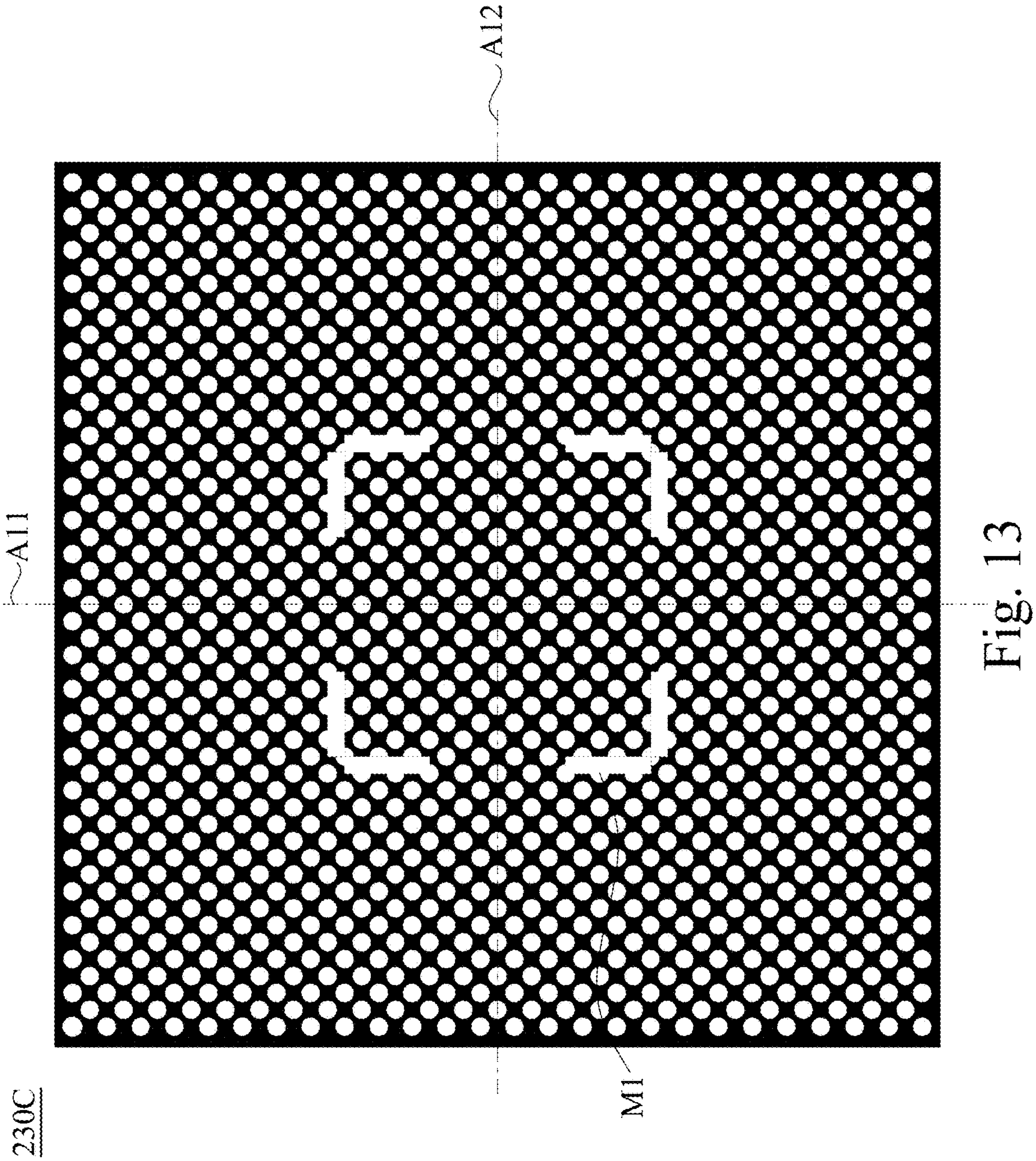
FIG. 13 is a schematic diagram of an alignment pattern of the fiber array unit according to an embodiment of the present disclosure.

Reference is made to FIG. 13. FIG. 13 is a schematic diagram of an alignment pattern 230C of the fiber array unit 200 according to an embodiment of the present disclosure. As shown in FIG. 13, the alignment pattern 230C includes a matrix of hollow points with two dimensions respectively along the axes A11, A12. Each of the hollow points is in form of a round dot. The alignment pattern 230C further includes an auxiliary alignment mark M1 arranged among the hollow points to form an alignment frame. The auxiliary alignment mark M1 includes four L-shaped hollow lines arranged to form an alignment frame. In some embodiments, the alignment pattern 230C may be regarded as a reverse pattern of the alignment pattern 230B. When the alignment pattern 230C is used to be aligned with an alignment pattern (not shown) of the substrate 110 of which a spatial frequency of the alignment pattern is equal to or similar to a spatial frequency of the alignment pattern 230C, whether the alignment is completed can also be determined based on whether the two alignment patterns generate moiré patterns.

Figure 14:
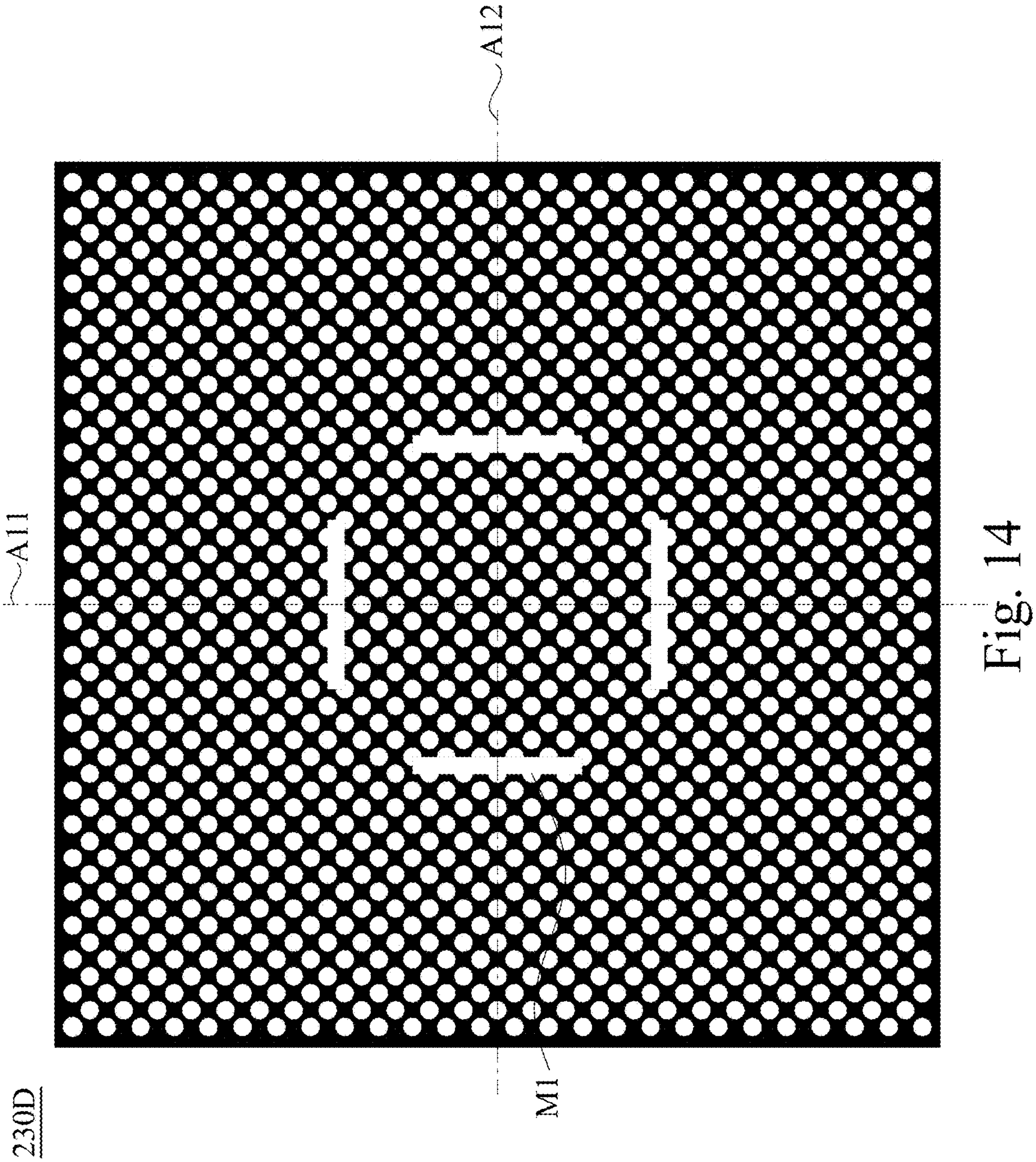
FIG. 14 is a schematic diagram of an alignment pattern of the fiber array unit according to an embodiment of the present disclosure.

Reference is made to FIG. 14. FIG. 14 is a schematic diagram of an alignment pattern 230D of the fiber array unit 200 according to an embodiment of the present disclosure. Compared to the alignment pattern 230C shown in FIG. 13, the auxiliary alignment mark M1 of the alignment pattern 230D shown in FIG. 14 includes four straight hollow lines arranged to form an alignment frame. When the alignment pattern 230D is used to be aligned with an alignment pattern (not shown) of the substrate 110 of which a spatial frequency of the alignment pattern is equal to or similar to a spatial frequency of the alignment pattern 230D, whether the alignment is completed can also be determined based on whether the two alignment patterns generate moiré patterns.

Figure 15:
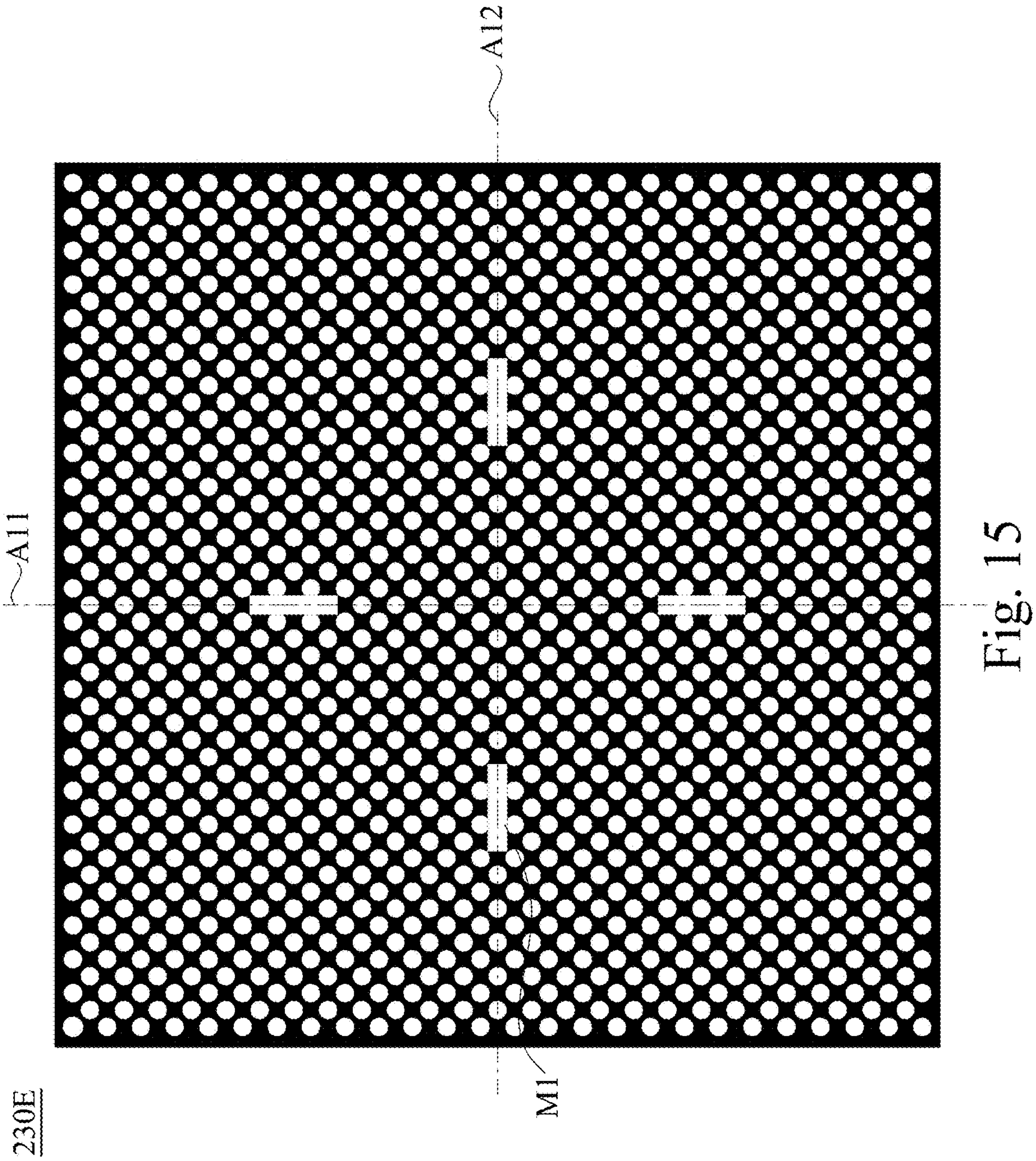
FIG. 15 is a schematic diagram of an alignment pattern of the fiber array unit according to an embodiment of the present disclosure.

Reference is made to FIG. 15. FIG. 15 is a schematic diagram of an alignment pattern 230E of the fiber array unit 200 according to an embodiment of the present disclosure. Compared to the alignment pattern 230C shown in FIG. 13, the auxiliary alignment mark M1 of the alignment pattern 230E shown in FIG. 15 includes four straight hollow lines. Specifically, two of the straight hollow lines are on and arranged along the axis A11, and the other two of the straight hollow lines are on and arranged along the axis A12. When the alignment pattern 230E is used to be aligned with an alignment pattern (not shown) of the substrate 110 of which a spatial frequency of the alignment pattern is equal to or similar to a spatial frequency of the alignment pattern 230E, whether the alignment is completed can also be determined based on whether the two alignment patterns generate moiré patterns.

According to the foregoing recitations of the embodiments of the disclosure, it can be seen that in the fiber array unit of the present disclosure, the alignment pattern disposed on the mating surface of the transparent structure is axially symmetrical about two axes that are perpendicular to each other. On the other hand, the alignment pattern disposed on the mating surface of the substrate of the photonics device is axially symmetrical about two axes that are perpendicular to each other, and the spatial frequencies of the two alignment patterns are equal or similar. When the two alignment patterns are viewed in a direction perpendicular to the two mating surfaces parallel to each other, the two alignment patterns that are not accurately aligned will produce moiré patterns. On the contrary, the two alignment patterns that are accurately aligned will not produce moiré patterns. Therefore, whether the alignment is completed can be determined based on whether the two alignment patterns generate moiré patterns, which has higher accuracy and lower cost compared to the conventional alignment method.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fiber array unit, comprising:

a transparent structure having an observing surface and a mating surface substantially parallel to each other, the observing surface and the mating surface being on a same light path, the transparent structure having a first alignment pattern formed on the mating surface, at least a portion of the first alignment pattern being transparent, wherein the first alignment pattern is axially symmetrical about two axes, and the two axes are perpendicular to each other; and a plurality of optical fibers at least partially located within the transparent structure, the plurality of optical fibers allowing light beams to enter the transparent structure through an entrance surface thereof and to exit from the mating surface thereof, wherein the plurality of optical fibers enter the transparent structure via an entrance surface, at least a portion of the optical fibers is exposed from the mating surface, and the mating surface is different from the entrance surface.

2. The fiber array unit of claim 1, wherein the transparent structure comprises:

a first portion; and a second portion engaged with the first portion, wherein the optical fibers are disposed between the first portion and the second portion.

3. The fiber array unit of claim 2, wherein the first portion has a side surface facing the second portion, a plurality of grooves are formed on the side surface, the second portion covers the grooves to respectively form a plurality of accommodating passages between the first portion and the second portion, and the optical fibers are respectively accommodated in the accommodating passages.

4. The fiber array unit of claim 2, wherein the transparent structure has a first end and a second end opposite to each other, the optical fibers pass into the transparent structure from the first end and extend toward the second end, and the mating surface is on the second end.

5. The fiber array unit of claim 4, wherein the first alignment pattern is disposed on one of the first portion and the second portion.

6. The fiber array unit of claim 2, wherein the mating surface is on a side of the second portion away from the first portion.

7. The fiber array unit of claim 1, wherein the transparent structure further has a second alignment pattern formed on the mating surface, at least a portion of the second alignment pattern is transparent, the second alignment pattern is axially symmetrical about two axes, the two axes are perpendicular to each other, and the observing surface is different from the entrance surface of the transparent structure.

8. The fiber array unit of claim 1, wherein the mating surface is substantially perpendicular to the entrance surface.

9. A photonics device, comprising:

a fiber array unit comprising a transparent structure, the transparent structure having an observing surface and a mating surface substantially parallel to each other, the observing surface and the mating surface being on a same light path, the transparent structure having a first alignment pattern formed on the mating surface, at least a portion of the first alignment pattern being transparent, wherein the first alignment pattern is axially symmetrical about two axes, and the two axes are perpendicular to each other wherein the fiber array unit further comprises a plurality of optical fibers entering the transparent structure via an entrance surface, at least a portion of the optical fibers is exposed from the mating surface, and the mating surface is different from the entrance surface; and a substrate comprising a second alignment pattern disposed thereon, wherein the second alignment pattern is axially symmetrical about two axes that are perpendicular to each other, and a spatial frequency of the first alignment pattern is equal to or similar to a spatial frequency of the second alignment pattern, wherein the first alignment pattern and the second alignment pattern are overlapped and aligned.

10. The photonics device of claim 9, wherein the transparent structure comprises:

a first portion; and a second portion engaged with the first portion, wherein the optical fibers are disposed between the first portion and the second portion.

11. The photonics device of claim 10, wherein the first portion has a side surface facing the second portion, a plurality of grooves are formed on the side surface, the second portion covers the grooves to respectively form a plurality of accommodating passages between the first portion and the second portion, and the optical fibers are respectively accommodated in the accommodating passages.

12. The photonics device of claim 10, wherein the transparent structure has a first end and a second end opposite to each other, the optical fibers enter the transparent structure from the first end and extend toward the second end, and the mating surface of the transparent structure is on the second end.

13. The photonics device of claim 12, wherein the first alignment pattern is disposed on one of the first portion and the second portion.

14. The photonics device of claim 10, wherein the mating surface of the transparent structure is on a side of the second portion away from the first portion.

15. The photonics device of claim 9, wherein the mating surface of the transparent structure and a mating surface of the substrate on which the second alignment pattern is disposed are parallel to each other.

16. The photonics device of claim 15, wherein the first alignment pattern and the second alignment pattern are aligned with each other in a direction perpendicular to the mating surface of the transparent structure and the mating surface of the substrate.

* * * * *